United States Patent [19]
Zoglman et al.

[11] Patent Number: 5,427,609
[45] Date of Patent: Jun. 27, 1995

[54] DEVICE FOR CLEANING AND DRYING COMPRESSED GAS

[75] Inventors: Norbert P. Zoglman, Farmington Hills; Daniel J. Fitzsimmons, Southfield; Brian J. Larson, West Bloomfield, all of Mich.

[73] Assignee: Horton Industries, Inc., Minneapolis, Minn.

[21] Appl. No.: 121,754

[22] Filed: Sep. 14, 1993

[51] Int. Cl.⁶ ..................... B01D 53/04; B01D 53/26
[52] U.S. Cl. ......................... 95/98; 95/105; 95/119; 95/122; 95/143; 96/135; 96/137; 96/142; 96/144; 96/149; 96/153; 55/274
[58] Field of Search ................. 55/274, 275; 95/21, 95/98, 105, 117-119, 122, 143; 96/113-117, 134-137, 142-144, 149, 153, 154

[56] References Cited

U.S. PATENT DOCUMENTS

| | | |
|---|---|---|
| 1,785,331 | 12/1930 | Spencer . |
| 1,811,597 | 6/1931 | Steinbart . |
| 2,096,851 | 10/1937 | Fricke . |
| 2,556,292 | 6/1951 | Newcum . |
| 2,593,132 | 4/1952 | Gannon . |
| 2,671,528 | 3/1954 | Gross ..................... 96/137 |
| 2,698,061 | 12/1954 | Jaubert . |
| 2,834,638 | 5/1958 | George . |
| 2,848,060 | 8/1958 | McBride et al. . |
| 3,001,605 | 9/1961 | Hill . |
| 3,029,581 | 4/1962 | Robbins . |
| 3,080,693 | 3/1963 | Glass et al. . |
| 3,080,977 | 3/1963 | Jones . |
| 3,151,071 | 9/1964 | Kasten . |
| 3,171,726 | 3/1965 | Roney et al. . |
| 3,182,435 | 5/1965 | Axt . |
| 3,207,311 | 9/1965 | Kasten . |
| 3,216,572 | 11/1965 | Kasten . |

(List continued on next page.)

FOREIGN PATENT DOCUMENTS

| | | |
|---|---|---|
| 0036569 | 9/1981 | European Pat. Off. . |
| 1505479 | 3/1978 | United Kingdom . |
| 2163366 | 2/1986 | United Kingdom . |

OTHER PUBLICATIONS

STARK ™ Manufacturing, a division of HORTON ® Industries, Inc., Parts List, Jan. 1993, STARK ™ Vehicle Air Dryer/Purifier Systems, EXPELLO ® Electronic Drain Valves, Repair Kits and Replacement Parts, L-22420-0-0193.

(List continued on next page.)

*Primary Examiner*—Robert Spitzer
*Attorney, Agent, or Firm*—Peterson, Wicks, Nemer & Kamrath

[57] ABSTRACT

A device (10) for removing contaminants from truck air systems or the like includes an assembly including a desiccant canister (100), a carrier (46), and a bottom closure (28) vertically removable in a passage (14) of a collar (12) mounted to the truck. The carrier (46) includes a horizontal plate (48) which divides the passage (14) into a coalescing chamber having a horizontally orientated, tubular coalescing filter (98) extending vertically above and diametrically over the sump including an electrically actuated purge valve (42) of the bottom closure (28). Air is directed vertically downward from the filter (98) by vertical legs (62) extending down from the horizontal plate (48) and on opposite sides of the filter (98). A follower plate (118) is biased in the canister (100) against the desiccant beads (116) by a wave spring (140) sandwiched thereagainst by a slideable retainer (142) fixed in the side wall (104) of the canister (100). A check valve is provided in the form of passages (132) through the follower plate (118) covered by a flexible disc (134) secured to the follower plate (118) by a screw (136) having a regeneration orifice (138) therethrough. Regeneration of the desiccant beads (116) occurs when the purge valve (42) is opened for a very short duration creating a pressure swing in the desiccant beads (116), with the pressure differential across the follower plate (118) causing the follower plate (118) to further compress the desiccant beads (116) to enhance the release of moisture.

56 Claims, 3 Drawing Sheets

U.S. PATENT DOCUMENTS

| | | | |
|---|---|---|---|
| 3,252,270 | 5/1966 | Pall et al. | |
| 3,279,151 | 10/1966 | Kauer, Jr. et al. | |
| 3,312,350 | 4/1967 | Kasten . | |
| 3,317,048 | 5/1967 | Kasten . | |
| 3,322,279 | 5/1967 | Kasten . | |
| 3,323,292 | 6/1967 | Brown . | |
| 3,339,735 | 9/1967 | Kasten . | |
| 3,347,026 | 10/1967 | Zankey . | |
| 3,402,972 | 9/1968 | Cooper et al. | |
| 3,434,599 | 3/1969 | Wischmeyer et al. | |
| 3,464,186 | 9/1969 | Hankison et al. | 96/115 |
| 3,472,000 | 10/1969 | Glass et al. | 96/113 |
| 3,477,210 | 11/1969 | Hervert | 96/144 |
| 3,483,677 | 12/1969 | Pinto . | |
| 3,507,097 | 4/1970 | Crowley et al. | |
| 3,572,008 | 3/1971 | Hankison et al. | 95/105 |
| 3,592,563 | 7/1971 | Glass et al. | 96/113 X |
| 3,593,498 | 7/1971 | Semon . | |
| 3,616,617 | 11/1971 | Groote . | |
| 3,676,987 | 7/1972 | Wunder et al. | |
| 3,680,283 | 8/1972 | Jones, Jr. | |
| 3,705,480 | 12/1972 | Wireman . | |
| 3,714,763 | 2/1973 | Suzuki . | |
| 3,715,866 | 2/1973 | Chatlos et al. | 55/275 X |
| 3,721,069 | 3/1973 | Walker . | |
| 3,726,307 | 4/1973 | Carman et al. | |
| 3,778,967 | 12/1973 | Kauer, Jr. et al. | |
| 3,796,025 | 3/1974 | Kasten . | |
| 3,832,831 | 9/1974 | Ritchie et al. | |
| 3,923,479 | 12/1975 | Glass et al. | |
| 3,934,990 | 1/1976 | Ide, III . | |
| 3,937,622 | 2/1976 | Hewitt et al. | 96/113 |
| 4,026,685 | 5/1977 | Grix | 96/113 |
| 4,043,774 | 8/1977 | McGrath . | |
| 4,052,178 | 10/1977 | Frantz . | |
| 4,071,337 | 1/1978 | Evans . | |
| 4,083,608 | 4/1978 | Shirey . | |
| 4,119,355 | 10/1978 | Kreitner . | |
| 4,131,442 | 12/1978 | Frantz . | |
| 4,259,097 | 3/1981 | Patel et al. | |
| 4,261,715 | 4/1981 | Frantz | 96/137 |
| 4,336,042 | 6/1982 | Frantz et al. | 96/144 |
| 4,398,929 | 8/1983 | Segersten . | |
| 4,487,617 | 12/1984 | Dienes et al. | 96/113 |
| 4,519,819 | 5/1985 | Frantz | 96/115 |
| 4,524,311 | 6/1985 | Yokota et al. | |
| 4,543,112 | 9/1985 | Ackley et al. | |
| 4,544,385 | 10/1985 | Tanaka | 96/114 |
| 4,549,888 | 10/1985 | Fannin . | |
| 4,572,725 | 2/1986 | Kojima | 96/137 |
| 4,581,047 | 4/1986 | Larsson . | |
| 4,652,801 | 3/1987 | Burdett . | |
| 4,655,801 | 4/1987 | Kojima et al. | |
| 4,673,419 | 6/1987 | Kojima | 96/144 |
| 4,685,941 | 8/1987 | Sato . | |
| 4,713,094 | 12/1987 | Yanagawa et al. | |
| 4,714,483 | 12/1987 | Koening et al. | |
| 4,738,692 | 4/1988 | Fresch et al. | 95/98 |

(List continued on next page.)

OTHER PUBLICATIONS

STARK TM Manufacturing, a division of HORTON ® Industries, Inc., Shop Air Protection Systems, L-223-46-0-1291.

Bendix, System Engineered Air Brake Equipment, Quick Reference Catalog, Allied Automotive, ©1983 The Bendix Corporation, BW-1114 R3-86, front and back cover, pp. 3, 34, 35, and 42-45.

Bendix, Bendix-Westinghouse Automotive Air Brake Company, Instruction & Service Data, AD-1 Air Dryer, SD-62, Jun. 3, 1971.

Bendix, Heavy Vehicle Systems Group, New System--Guard AD-2 Air Dryer, BW-1198 R, Sep. 1974.

Bendix, Heavy Vehicle Systems Group, System-Guard AD-2 Air Dryer, BW-1198 R, Jul. 1976.

Heavy Duty Trucking, p. 14, Air Dryer, Bendix AD-3 Air Dryer, Circle 235 on Reader Action Card.

Bendix, See less of your trucks. Install the new Bendix AD-4 Air Dryer. Allied Automotive, BW-1366, Sep. 1987.

Bendix, The Bendix AD-9 air dryer . . . Hit paydirt. With plenty of payback. BW 1620, ©Allied Signal Inc., Feb. 1990.

Bendix, Heavy Vehicle Systems, Service Data, AD-9 Air Dryer, SD-08-2412, Mar. 1990.

Midland-Grau, Heavy Duty Systems, The Pure Air Plus TM Air Dryer. The best air dryer for your brake system. Pure and simple. Aug. 1992, 10M HPK L20100, ©1992.

Midland-Grau, Heavy Duty Systems, The Pure Air Plus TM Air Dryer. The best air dryer for your brake system. Pure and simple. Oct. 1992, 50M ART L54026.

Hendrickson, Australia Pty Ltd, Truckmaster, Model XT-300, Give your Air System the 'All-Clear'! A C N 004 992 789.

U.S. PATENT DOCUMENTS

| Patent No. | Date | Inventor | Class |
|---|---|---|---|
| 4,764,189 | 8/1988 | Yanagawa et al. | 96/114 |
| 4,806,134 | 2/1989 | Lhota . | |
| 4,812,148 | 3/1989 | Hata et al. . | |
| 4,816,047 | 3/1989 | Neal | 96/137 |
| 4,892,569 | 1/1990 | Kojima | 96/113 |
| 4,936,026 | 6/1990 | Cramer et al. . | |
| 4,955,994 | 9/1990 | Knight et al. . | |
| 4,971,610 | 11/1990 | Henderson | 55/275 X |
| 4,999,035 | 3/1991 | Warndorf | 55/275 X |
| 5,002,593 | 3/1991 | Ichishita et al. | 96/137 |
| 5,027,529 | 7/1991 | Cramer et al. . | |
| 5,103,576 | 4/1992 | Cramer et al. . | |
| 5,110,327 | 5/1992 | Smith . | |
| 5,110,330 | 5/1992 | Loughran | 96/134 |
| 5,122,172 | 6/1992 | Sherwood et al. | 96/149 |
| 5,129,927 | 7/1992 | Tsubouchi | 96/113 |
| 5,145,495 | 9/1992 | Elamin | 96/114 |
| 5,186,522 | 2/1993 | Spencer | 96/137 X |
| 5,209,764 | 5/1993 | Eberling | 96/114 |
| 5,257,008 | 10/1993 | Elamin . | |
| 5,275,642 | 1/1994 | Bassine | 96/149 |
| 5,286,282 | 2/1994 | Goodell et al. | 96/113 |
| 5,286,283 | 2/1994 | Goodell | 96/113 |

DEVICE FOR CLEANING AND DRYING COMPRESSED GAS

BACKGROUND

The present invention generally relates to devices for cleaning compressed gas, particularly to devices for cleaning and drying compressed gas, more particularly to devices for cleaning and drying compressed air, and most specifically to devices for cleaning and drying compressed air systems for trucks and the like.

The need to collect and remove air system contaminants in solid, liquid and vapor form before they enter the air system has been long recognized. However, various devices attempting to solve this need have many shortcomings. As examples, such prior devices required top access for servicing the unit. Since the devices are typically mounted to the undercarriage of the truck where top access is limited, it was often necessary to remove the device from the truck and the air system to allow servicing, which is very time consuming and often results in breakage of the air conduits or other parts of the air system. Another problem of the prior art is the inefficiencies of the desiccant material. Specifically, prior devices often left the purge valve open to the atmosphere for long periods of time such as whenever the compressor was in an unload mode. Due to its affinity to moisture, the desiccant material would absorb moisture from the atmosphere when the purge valve was open, especially during very humid days, and the desiccant material would then have reduced ability to absorb moisture when on line with the air system during the drying cycle. Also, the desiccant material in prior devices would develop dead spots because the regeneration air would not remove moisture from all locations of the desiccant material during the regeneration cycle due to channeling in the desiccant material and other problems. Further, the regeneration cycle of the desiccant material in prior devices was often inefficient at the removal of moisture. Furthermore, regeneration of the desiccant material in prior devices was often limited by the contamination of the desiccant material such as by oils which are absorbed by but which are not released by the desiccant material. Although various approaches have been utilized to prevent such contamination, they have been ineffective in doing so. Additionally, prior devices have been of a relatively large size which restricts their potential installation locations. Further, prior devices have been of a complicated design requiring extensive controls for the regeneration cycle, compressor isolation valves to prevent turbo rush, regeneration storage reservoirs for regeneration air since an insufficient amount of regeneration air was available, and other such structures. Another major problem was that often the need for servicing prior devices was first noticed only after or because contamination was belatedly noticed in the system downstream from the device, therefore requiring extensive reconditioning of the air system to purge it of these contaminants. Thus, with these and other problems and disadvantages of prior devices, a continuing need exists for devices for collecting and removing contaminants from compressed gas systems which overcomes the many shortcomings of prior attempts to solve this need.

SUMMARY

The present invention solves this need and other problems in the field of collecting and removing contaminants from compressed gas systems, by providing, in the preferred form, a unique method for regenerating the desiccant material utilizing a pressure swing where the desiccant material on one side is exposed to reduced pressure for a very limited time while compressed gas is allowed to pass to the other side of the desiccant material through a regeneration orifice at a restricted rate. In a further aspect of the present invention, the regeneration orifice is formed in a follower plate which moves relative to the desiccant material by the pressure differential across the follower plate having the first side exposed to reduced pressure such as atmospheric and the other side exposed to the pressure of the compressed gas.

In further aspects of the present invention, the regeneration orifice is formed in a screw which secures a flexible disc positioned over passages of a check valve so that the path of the compressed gas through the desiccant beads from the regeneration orifice is generally the same as to the check valve passages to help eliminate dead spots in the desiccant material.

In other aspects of the present invention, the desiccant material is biased in a canister by a spring sandwiched between a follower plate and a spring retainer retained in the desiccant canister at adjustable locations to allow the desiccant canister and the overall device to have a reduced height. In still other aspects of the present invention, the device allows servicing from the bottom by providing an assembly which is removably and vertically insertable into the lower open end of a housing. The assembly includes the desiccant canister, closes the lower open end of the housing, and divides the interior of the housing into a first inlet portion in communication with the desiccant canister at one end and a second portion in communication with the desiccant canister at the other end. In further aspects of the present invention, a coalescing filter and a pressure relief valve are secured to a plug insertable into an opening in the housing. An inlet is in fluid communication with an inlet chamber in the opening defined by the plug to allow removal and servicing of the coalescing filter from the opening without disconnecting the inlet from the air system.

In another aspect of the present invention, against conventional practice and wisdom, the tubular coalescing filter is horizontally orientated, vertically above and diametrically across the sump to allow servicing from the side of the device, to allow placement of the desiccant canister vertically above the filter, and to reduce the height requirements of the filter and of the overall device. In a further aspect of the present invention, the compressed gas stream is directed vertically downward and intermediate legs located on opposite sides of the filter to enhance the wicking down of the coalesced liquid molecules to a wet zone located at the vertically lower portions of the filter.

Also, in other aspects of the present invention, the desiccant material is supported on first and second porous pads impregnated with activated carbon and activated alumina which have an affinity for and trap oil aerosols prior to the compressed gas entering the desiccant material to enhance the life of the desiccant material.

Furthermore, in other aspects of the present invention, the desiccant material abuts against pads which in turn are supported on surfaces and extend over enlarged cavities formed in the surface and in fluid communication with axial passages for diffusing the compressed gas from the passages and throughout the area of the enlarged cavities.

It is thus an object of the present invention to provide a novel device for collecting and removing contaminants from compressed gas.

It is further an object of the present invention to provide such a novel device which is serviceable from the side and/or the bottom without requiring removal of the device from the installation or from the gas system.

It is further an object of the present invention to provide such a novel device including several stages of oil removal to protect the desiccant material.

It is further an object of the present invention to provide such a novel device having a horizontally oriented coalescing filter to reduce the overall height requirements.

It is further an object of the present invention to provide such a novel device including flow direction to enhance the wicking of the coalesced liquid to a reduced wet zone in a horizontally orientated, tubular, coalescing filter.

It is further an object of the present invention to provide such a novel device utilizing a unique method of desiccant pressure swing regeneration with the purge valve open for only a very short duration.

It is further an object of the present invention to provide such a novel device which enhances the pressure swing desiccant regeneration by further compressing the desiccant material during the regeneration cycle.

It is further an object of the present invention to provide such a novel device which enhances the efficiency of the desiccant regeneration cycle.

It is further an object of the present invention to provide such a novel device which reduces dead spots in the desiccant material.

It is further an object of the present invention to provide such a novel device which reduces flow channeling through the desiccant material.

It is further an object of the present invention to provide such a novel device wherein the regeneration path through the desiccant material is generally the same as the drying path through the desiccant material.

It is further an object of the present invention to provide such a novel device wherein the biasing spring is sandwiched against a retainer which is adjustably positioned at manufacture to reduce the overall height requirements.

It is further an object of the present invention to provide such a novel device which provides signals to the operator for the need for servicing.

It is further an object of the present invention to provide such a novel device which is of simple design, yet obtaining increased overall efficiency.

It is further an object of the present invention to provide such a novel device which is of a reduced overall size.

It is further an object of the present invention to provide such a novel device which maximizes the potential installation locations.

It is further an object of the present invention to provide such a novel device which does not require the use of turbo boost isolation valves.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
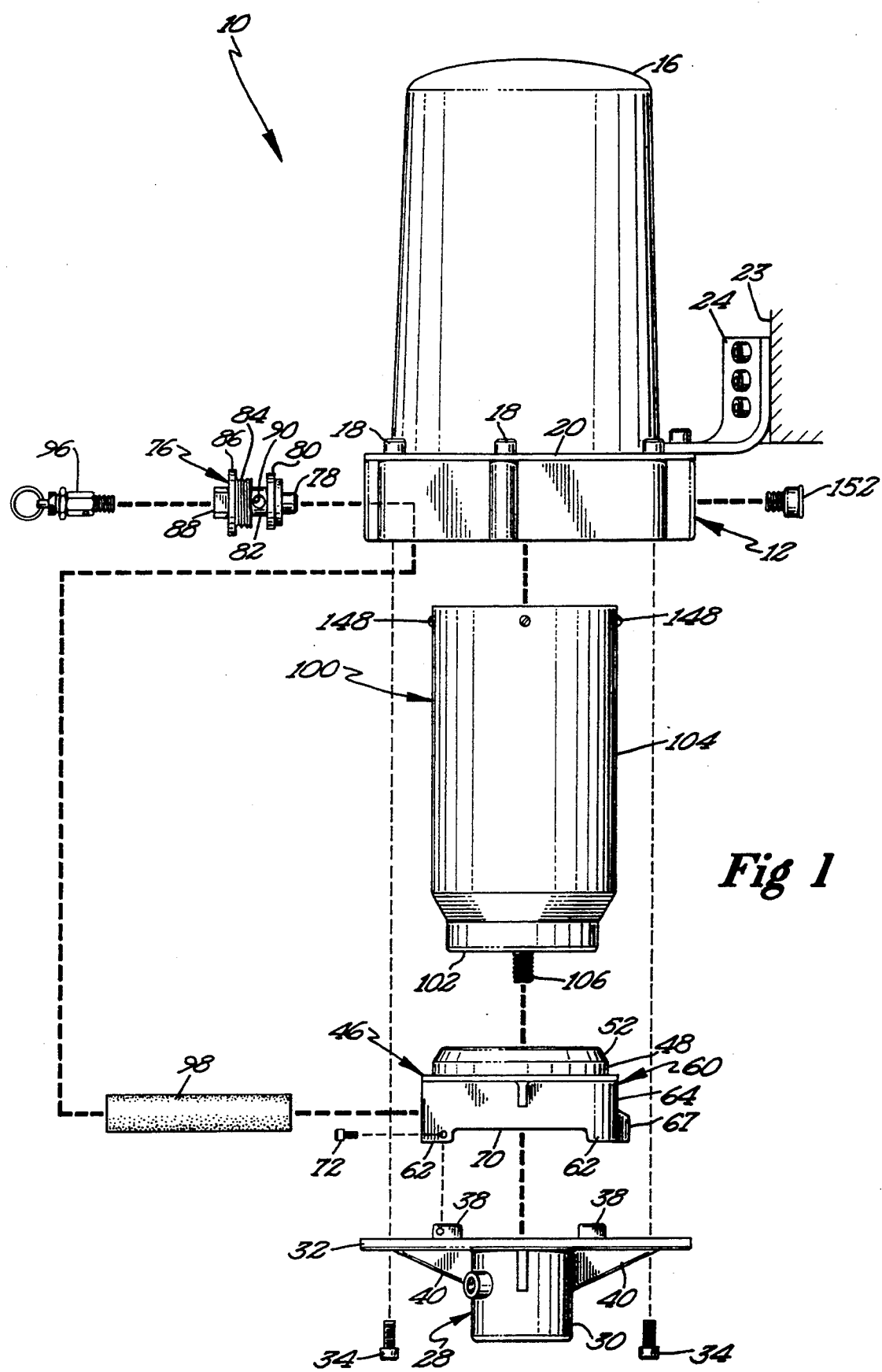
FIG. 1 shows an exploded perspective view of a device for cleaning and drying compressed gas according to the preferred teachings of the present invention.
Figure 2:
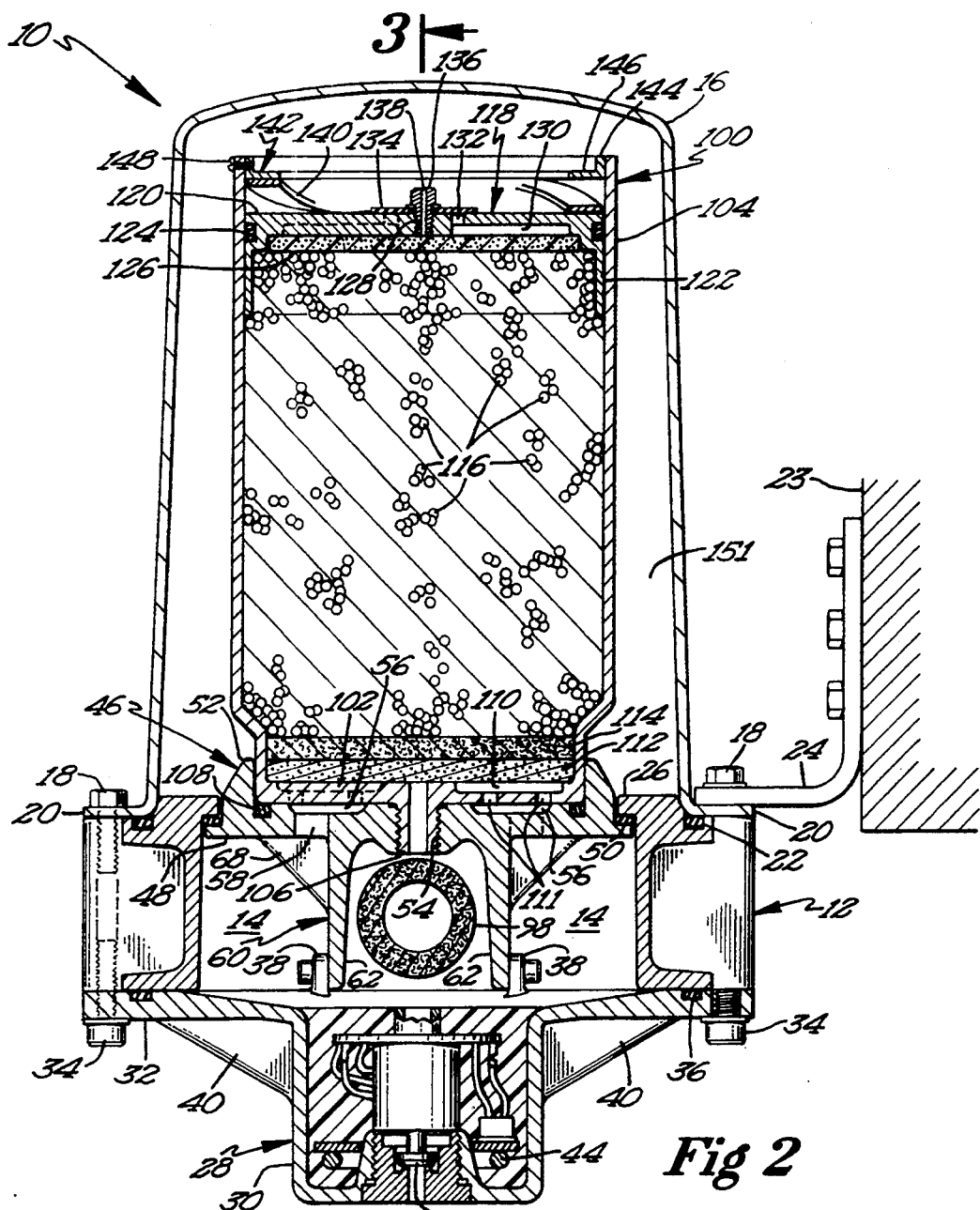
FIG. 2 shows a cross-sectional view of the device of FIG. 1.
Figure 5:
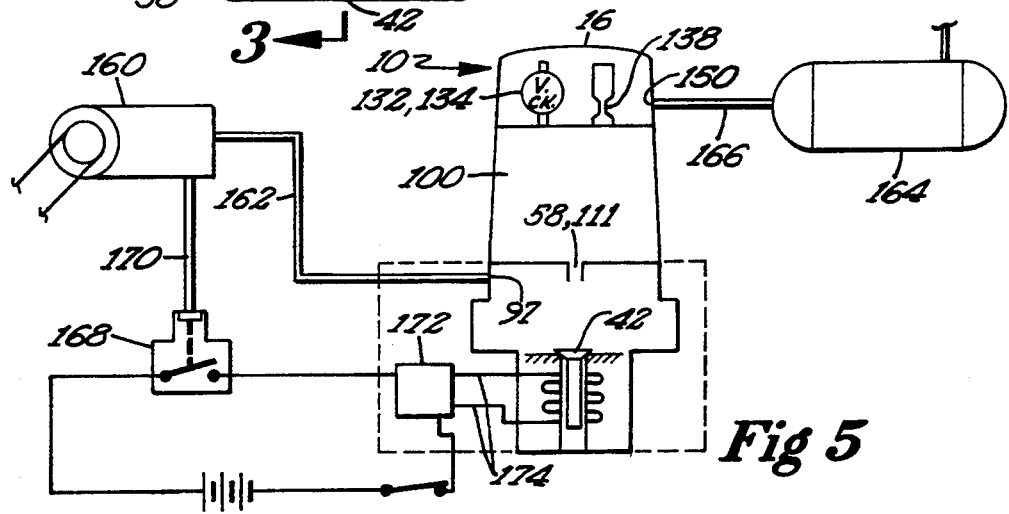
FIG. 5 shows a diagrammatic view of an air system including the device of FIG. 1.
Figure 3:
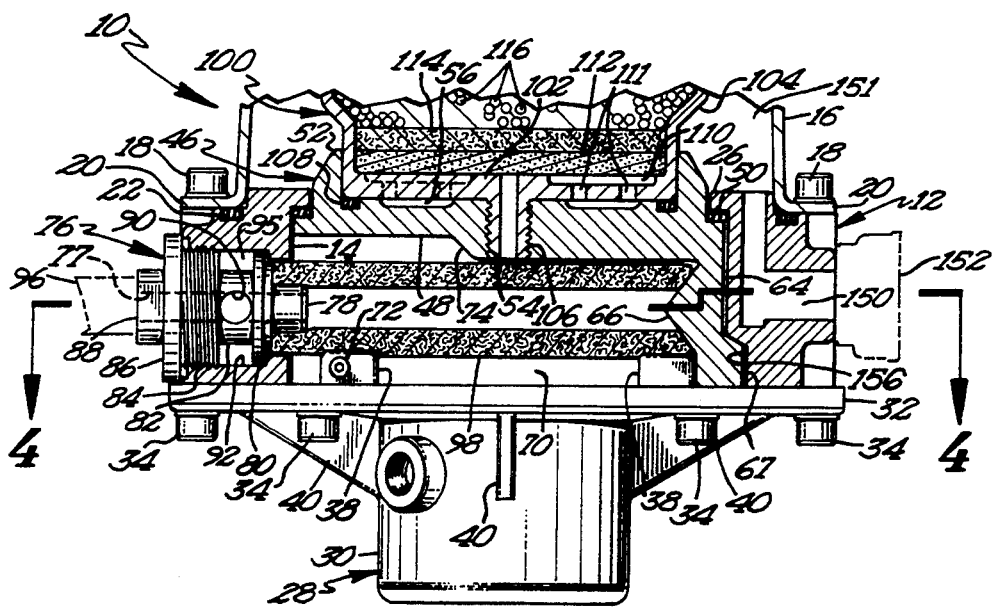
FIG. 3 shows a partial, cross-sectional view of the device of FIG. 1 according to section line 3—3 of FIG. 2.
Figure 4:
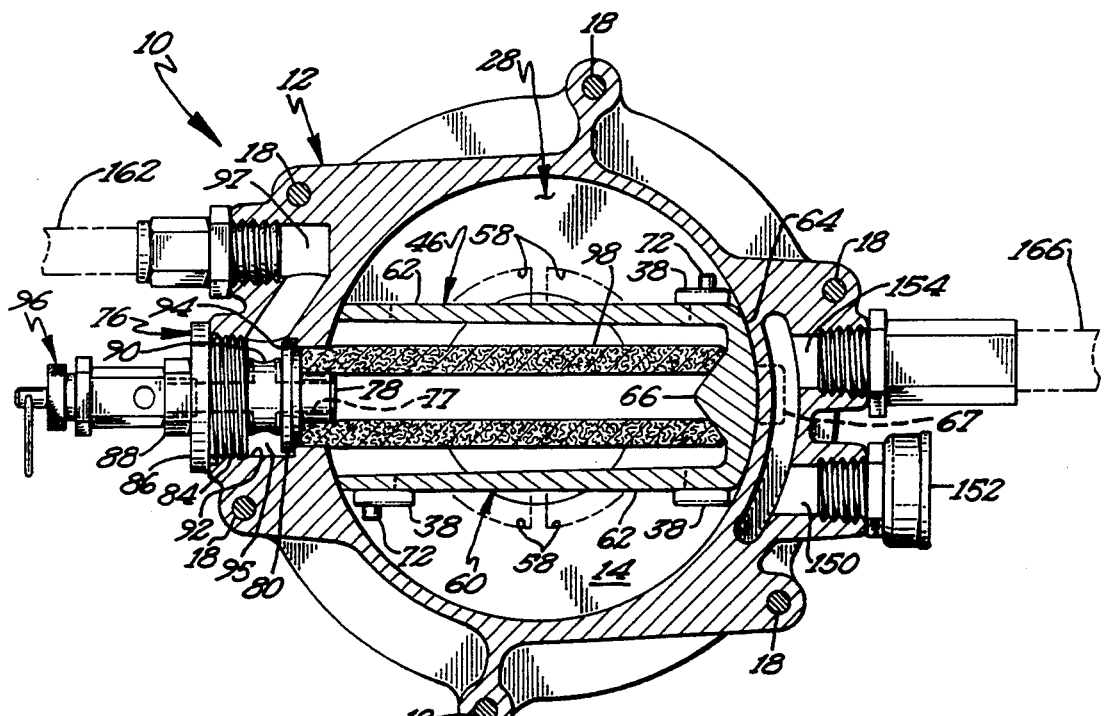
FIG. 4 shows a cross-sectional view of the device of FIG. 1 according to section line 4—4 of FIG. 3.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "outer", "inner", "end", "side", "radial", "circumferential", "axial", and similar terms are used herein, it should be understood that these terms have reference only to the structure shown in the drawings as it would appear to a person viewing the drawings and are utilized only to facilitate describing the invention.

DESCRIPTION

A device for cleaning and drying compressed gas according to the preferred teachings of the present invention is shown in the drawings for removing oil, water, and other contaminants from air systems such as for the brakes of trucks or the like and is generally designated 10. Device 10 generally includes an annular collar 12 having an internal, vertical passage 14 therethrough. A shell 16 having a lower open end is secured to the top surface of collar 12 such as by bolts 18 extending through openings formed in an annular flange 20 extending around the open end of shell 16 and threadably received in collar 12. Provisions such as O-rings 22 can be provided to seal shell 16 to collar 12 to form a hollow housing defining an interior. Thus, passage 14 is in fluid communication with the hollow interior of the housing formed by collar 12 and shell 16 and includes a lower open end. Collar 12 and shell 16 secured thereto can be mounted to a frame 23 of the truck or the like such as by a bracket 24 as shown, with bolts 18 extending through openings formed in bracket 24 prior to annular flange 20. An annular lip 26 extends adjacent the top surface of collar 12 into passage 14.

Device 10 further includes a bottom closure 28. Bottom closure 28 generally includes a cylindrical portion 30 having a diameter smaller than passage 14. An annular flange 32 extends generally radially from the open upper end of cylindrical portion 30 to free edges of a size and shape larger than passage 14. Flange 32 is sloped slightly from the free edges thereof toward cylindrical portion 30 to form a sump. Bottom closure 28 is secured to collar 12 such as by bolts 34 extending through openings formed in annular flange 32 and threadably received in collar 12. Provisions such as O-rings 36 can be provided to seal bottom closure 28 to collar 12. Lugs 38 are provided on opposite diametric sides of annular flange 32. Suitable, generally triangular-shaped webs 40 can be provided extending between the outer surfaces of annular flange 32 and cylindrical portion 30. Cylindrical portion 30 generally includes a sump valve 42 for allowing the escape of oil and water located on bottom closure 28. In the most preferred form, valve 42 is electrically actuated. Additionally, cylindrical portion 30 may include an electrical heater 44 which can be utilized to heat the oil and water located on bottom closure 28 when device 10 is utilized in below-freezing temperatures.

Device 10 further includes an internal carrier 46 for slideable receipt in passage 14. Particularly, carrier 46 includes a horizontal, generally circular plate 48 having a size and shape generally equal to and for slideable receipt in passage 14, but larger than the opening defined by lip 26. Provisions such as O-rings 50 can be provided to seal plate 48 to collar 12 within passage 14. It can then be appreciated that the interior of the housing formed by collar 12 and shell 16 is divided into a first portion or a coalescing chamber defined by passage 14 between bottom closure 28 and plate 48 and a second portion generally defined by shell 16 above plate 48.

An annular, axially extending flange 52 upstands from circular plate 48 generally concentrically to the outer periphery thereof. A threaded bore 54 extends axially through plate 48 at the diametric center thereof. An annular cavity 56 is located on the top surface of circular plate 48 intermediate flange 52 and bore 54. Axial passages 58 extend at quadrantly spaced locations from cavity 56 to the bottom surface of circular plate 48. A U-shaped lip 60 extends axially from the bottom surface of circular plate 48. Specifically, lip 60 includes first and second, spaced, parallel, vertical legs 62 extending from plate 48 and having a length generally equal to and for slideable receipt in passage 14. Lip 60 further includes a vertical connecting portion 64 extending from plate 48, between and connecting the first ends of legs 62. The inner surface of connecting portion 64 intermediate legs 62 includes a conical land 66 projecting radially inward therefrom. The outer surface of connecting portion 64 includes a vertically extending positioning boss 67. Passages 58 are generally arcuately shaped and are located outward of lip 60. Generally triangular-shaped webs 68 can be provided extending between the bottom surface of circular plate 48 and legs 62 and intermediate passages 58. The lower free edges of legs 62 can have removed portions 70 spaced from the ends thereof. Carrier 46 is supported on and can be secured to bottom closure 28 such as by screws 72 extending between lugs 38 and legs 62. In the most preferred form, the bottom surface of circular plate 48 can include reenforcement 74 positioned between legs 62 from connecting portion 64 to and including threaded bore 54.

Device 10 further includes a plug 76 having a through passage 77 extending therethrough. The outer surface of plug 76 includes, from the inner end towards the outer end thereof, a filter nipple 78 at the inner end thereof, a two-step radially extending shoulder 80, a central portion 82, a threaded portion 84, a radially extending shoulder 86, and a portion 88 at the outer end thereof. The second step of shoulder 80 and threaded portion 84 have generally equal diameters. The first step of shoulder 80 and central portion 82 have diameters less than the second step of shoulder 80 and threaded portion 84. Shoulder 86 has a diameter larger than the second step of shoulder 80 and threaded portion 84. Nipple 78 has a diameter less than the first step of shoulder 80. Portion 88 includes suitable provisions such as having non-circular cross sections and including flat, parallel sides for receipt of an installation wrench or the like. A cross passage 90 extends radially through central portion 82 and intersects with passage 77.

Collar 12 in the preferred form includes a radially extending opening 92 positioned intermediate the second ends of legs 62 and having a diameter generally equal to the second step of shoulder 80 and threaded portion 84. Opening 92 includes a threaded portion adjacent the outer radial end thereof for threadable receipt of threaded portion 84. Opening 92 further includes a radially extending lip 94 adjacent the inner radial end thereof for abutment and sealing with the second step of shoulder 80. Shoulder 86 abuts and seals with collar 12 radially outward of opening 92. Thus, an inlet chamber 95 is formed and defined by Opening 92, the second step of shoulder 80, and shoulder 86.

Device 10 according to the preferred teachings of the present invention further includes a pressure relief valve 96 threadably received in the outer radial end or port of passage 77 of plug 76 at portion 88. In the most preferred form, valve 96 provides an audible signal in the event that air is allowed to escape therethrough. Collar 12 further includes an air inlet 97 having a first end circumferentially spaced from opening 92 and a second end intersecting with opening 92 intermediate the radial inner and outer ends thereof. Thus, inlet 97 is in fluid communication with passage 14 of collar 12 by inlet chamber 95, cross passage 90, and passage 77.

Device 10 according to the preferred teachings of the present invention further includes a coalescing filter 98 which in the preferred form is cylindrical in shape of a size and shape for passage through opening 92. In the preferred form, filter 98 has an axial through passage for axial flow therethrough, with cross sections of filter 98 perpendicular to the axial through passage and the axial flow direction including inner and outer diameters. In the preferred form, filter 98 is a vacuum formed glass tube of the type previously used in STARK ® vehicle air dryer/purifier systems, with the pore size increasing from the center of filter 98 to the outside thereof to allow the liquid particles to grow and coalesce as they touch each other while they pass through the glass fibers of filter 98. The inner diameter of the axial through passage of filter 98 is of a size and shape for slideable receipt on nipple 78 of plug 76 for fluid communication with the inner radial end or port of passage 77 of plug 76 at nipple 78. Filter 98 is sandwiched between the first step of shoulder 80 of plug 76 and connecting portion 64 of carrier 48 when plug 76 is threaded into opening 92. Conical land 66 helps center and retain the end of filter 98 opposite plug 76, with vibrations of use of device 10 on a truck or like also causing filter 98 to slide and center on conical land 66. In the most preferred form, filter 98 is oriented with the axial flow direction being horizontal and extends directly vertically over cylindrical portion 30 and diametrically across the sump of bottom closure 28 to maximize fluid communication, i.e. drainage of liquid which coalesces on filter 98 and falls onto bottom closure 28.

Device 10 according to the preferred teachings of the present invention also includes a canister 100. Canister 100 includes a circular bottom wall 102 and a generally cylindrical side wall 104 upstanding from bottom wall 102. Bottom wall 102 has a shape and size for slideable receipt in flange 52 of carrier 46 and includes an axially extending threaded stud 106 located centrally thereof. Stud 106 is threadably received in threaded bore 54 of carrier 46, with flange 52 piloting side wall 104 and canister 100. Provisions such as O-ring 108 can be provided to seal canister 100 to carrier 46. In the most preferred form, stud 106 is hollow for ease of fabrication as an integral piece with bottom wall 102. The top surface of bottom wall 102 includes cavities 110 of a generally wedge shape. Axial passages 111 extend at spaced locations from cavities 110 to the bottom surface of bottom wall 102 and are in fluid communication with cavity 56 of carrier 46.

Canister 100 further includes, according to the preferred teachings of the present invention, first and second porous pads 112 and 114 impregnated with activated carbon and activated alumina. Activated carbon has an affinity for large molecules of oil whereas activated alumina has an affinity for smaller molecules of oil. Pads 112 and 114 in the most preferred form are formed of a woven plastic material. Pad 112 is supported upon bottom wall 102 over cavities 110 and has an outer periphery of a size and shape corresponding to and for slideable receipt in side wall 104. Porous pad 114 is supported upon pad 112 and has an outer periphery of a size and shape corresponding to and for slideable receipt in side wall 104. Desiccant beads 116 are supported upon porous alumina pad 114 and within side wall 104, with pads 112 and 114 preventing beads 116 from falling into and plugging cavities 110 and passages 111. In the most preferred form, beads 116 utilized in canister 100 are molecular sieve, air brake grade, bead size 8 × 12.

Canister 100 further includes, according to the preferred teachings of the present invention, a follower plate 118 supported on desiccant beads 116. Plate 118 generally includes a circular top wall 120 and a generally cylindrical, axially downward extending flange 122 of a size and shape corresponding to and for slideable receipt in side wall 104. Provisions such as O-ring 124 can be provided to seal follower plate 118 and side wall 104 of canister 100. Wall 120 of follower plate 118 includes a central, threaded opening 128. The lower surface of wall 120 of follower plate 118 further includes cavities 130 of a generally wedge shape and extending towards but spaced from the top surface of wall 120 of follower plate 118. A filter 126 having a size and shape corresponding to and for slideable receipt in flange 122 extends over cavities 130 and is sandwiched between beads 116 and wall 120 of follower plate 118. Axial passages 132 extend at spaced locations from cavities 130 to the top surface of wall 120 of follower plate 118 and closely adjacent to central opening 128. In the most preferred form, passages 132 are arcuate in shape and are arranged generally concentrically around central opening 128. A flexible valve disc 134 is supported on the top surface of wall 120 of follower plate 118 and extends over passages 132. An orifice screw 136 extends through an opening in disc 134 and is threadably received in opening 128 for sandwiching the center portion of valve disc 134 against wall 120 of follower plate 118. Screw 136 includes a central, regeneration orifice 138 extending axially therethrough and having a very small diameter in the order of 0.040 to 0.047 inches (1.02 to 1.19 mm) to allow restricted air flow therethrough. A crest-to-crest, spirawave spring 140 abuts with the top surface of wall 120 of follower plate 118. A spring retainer 142 abuts with and sandwiches spring 140 against wall 120 of follower plate 118. In the preferred form, spring retainer 142 includes a cylindrical portion 144 of a size and shape corresponding to and for slideable receipt in side wall 104 of canister 100. An annular flange 146 extends generally perpendicular to the lower edge of cylindrical portion 144. Spring retainer 142 is retained in canister 100 by any suitable means such as self-tapping screws 148 extending through side wall 104 and cylindrical portion 144. It can then be appreciated that follower plate 118 biased by spring 140 places desiccant beads 116 under compression forces even if there is slight degradation of beads 116 over time.

Collar 12 includes an outlet 150 having a first end at the top surface and in fluid communication with the interior of the housing defined by collar 12 and shell 16 and specifically with an annular space 151 between shell 16 and canister 100 and having a second end at the radially outer edge of collar 12. Device 10 according to the preferred teachings of the present invention further includes a moisture indicator 152 which in the most preferred form provides a visual signal of the humidity of the air downstream of canister 100. In the most preferred form, moisture indicator 152 is threadably received in a passage 154 in collar 12 and is in fluid communication with outlet 150 and/or with annular space 151. A trough 156 is formed in passage 14 of collar 12 below outlet 150 and passage 154 for slideably receiving positioning boss 67.

Device 10 according to the preferred teachings of the present invention is utilized in an air system including a source of compressed gas such as a compressor 160 having an outlet in fluid communication with inlet 97 of device 10 such as by conduit 162. Outlet 150 of device 10 is in fluid communication with a storage reservoir 164 such as by conduit 166. The compressed gas in storage reservoir 164 is available for use in the air system such as for operating the brakes, suspension system, or the like of the truck. A pressure switch 168 is in fluid communication with the compressor unloader port 170 of the compressor 160 for electrically actuating a timer control 172 which in turn electrically actuates valve 42 through wires 174 to open for a very short time period, in the order of 35 seconds, if compressor 160 remains in the unload mode.

Now that the basic construction of device 10 according to the preferred teachings of the present invention has been explained, the operation and subtle features and advantages of device 10 can be set forth and fully appreciated. First, when compressed air from compressor 160 is introduced through conduit 162 into inlet 97, the air enters inlet chamber 95 and cross passage 90 and flows through passage 77 of plug 76 into filter 98. Air then passes through filter 98, With filter 98 filtering out any large particles and other solids carried by the intake air flow, which particles and solids are trapped inside and held permanently by filter 98. Filter 98 also has the effect of coalescing any oil or other liquid molecules including free or bulk water as they are forced through the glass fibers of filter 98 which has the action of separating them from the air flow. It can then be appreciated that any oil or other liquid molecules which coalesce will tend to flow under gravitational forces to the lower portions of filter 98. After leaving filter 98, the air will still include water vapor and perhaps trace oil vapors or aerosols. Taking the path of least resistance, the air will then tend to flow through the upper portion of filter 98 and be directed downwardly by legs 62, with legs 62 located on opposite sides of filter 98 and the bottom surface of plate 48 located above filter 98 and intermediate legs 62 creating a U-shaped tunnel around filter 98. The air then passes through removed portions 70 and flows upward between the outer surfaces of legs 62 and passage 14.

It can then be appreciated that the air flow has a 180° change in direction as it passes from between legs 62 to outside of legs 62, with such a change in direction enhancing the separation of material carried by the air flow due to its inability to easily change direction with the air. Any material so separated from the air flow, as well as oil and the like falling from filter 98, will tend to collect on bottom closure 28 and not be retrained in the air flow.

Air will then continue to travel upward through passages 58 and cavity 56 to passages 111 and cavities 110, with cavity 56 diffusing the compressed air from passages 58 to passages 111. From cavities 110, air flows through pads 112 and 114 to desiccant beads 116, with cavities 110 diffusing the compressed air from passages 111 to pad 112. Any oil aerosols still in the air flow at that point will impinge the activated carbon and activated alumina of pads 112 and 114 and stay there. The activated carbon and activated alumina of pads 112 and 114 have a great affinity for oil aerosols because the size of the pores of the activated carbon and activated alumina is much larger than that of beads 116 to facilitate trapping any oil which passes through pads 112 and 114.

Still further, pads 112 and 114 act as a diffuser to provide a distribution of air at the bottom of beads 116 to prevent channeling of air flow through beads 116 which would occur if air flow were introduced directly into beads 116 through entrance holes and continued with a channel action all the way through the bed of beads 116 due to the very tight pack of beads 116 in the bed. Pads 112 and 114 have a micron rating in the order of 40-to-50 to prevent any powder arising from the physical disintegration of beads 116 from passing into cavities 110 and through passages 111.

As the air flows through beads 116, beads 116 pull any water vapor out of the air flow as it flows to filter 126. Filter 126 also acts as an air diffuser and has a micron rating in the order of 30 to prevent any powder arising from the physical disintegration of beads 116 from passing into cavities 130 and through passages 132 and/or into orifice 138. From filter 126, air will pass into cavities 130 and into passages 132, with cavities 130 diffusing the compressed air from filter 126 to passages 132. Air flowing through passages 132 will tend to flex valve disc 134 raising the peripheral edges thereof from the top surface of wall 120 of follower plate 118. It can now be better appreciated that, although orifice 138 allows flow in a parallel arrangement, air flow will tend to occur through cavities 130 and passages 132 and around valve disc 134 rather than through orifice 138 due to the restricted size of orifice 138 allowing flow rates substantially smaller than through passages 132. Air passing around valve disc 134 will then flow downward in annular space 151 to and through outlet 150, through conduit 166 and to storage reservoir 164.

Now that the basic operation of device 10 of the present invention has been read and understood, novel regeneration of canister 100 and specifically beads 116 can be further explained. Regeneration of beads 116 occurs according to the preferred teachings of the present invention by use of a pressure swing caused by shocking beads 116 through rapidly depressurizing canister 100. Specifically, when pressure switch 168 senses pressure which would indicate that compressor 160 is disengaged, valve 42 is electrically actuated so as to open for a very short time period, in the order of 35 seconds unless compressor 160 reengages during that time period in which event valve 42 closes to stop regeneration. Since air in device 10 is under pressure, opening valve 42 to atmosphere which has a pressure less than the compressed air in device 10 causes the pressurized air to rapidly flow from device 10, through valve 42, thus carrying out any fluids and other materials located on bottom closure 28. Air will thus be drawn downward through passages 58, cavity 56, passages 111, and cavities 110. Air will be drawn through pads 112 and 114, desiccant beads 116, and filter 126 to cavities 110. As air passes through beads 116, it will pick up the moisture released by beads 116 due to the pressure swing and bring the moisture to the atmosphere through valve 42. Because air pressure retained inside chamber 151 will push valve disc 134 against wall 120 of follower plate 118 blocking passages 132, pressurized air can only escape from space 151 through orifice 138 of screw 136. Thus, in the regeneration mode, only a restricted amount of air is allowed to pass through orifice 138.

It should be noted that after valve 42 closes at the end of a regeneration cycle, air will continue to enter orifice 138 until device 10 and conduit 162 reaches an equilibrium pressure which is greater than atmospheric pressure. In the most preferred form, a check valve is provided in outlet 150 to prevent any significant amount of pressure drop in the system. This is quite advantageous for several reasons. Specifically, all the while compressor 160 is disengaged, beads 116 will be drawing moisture from the air located in canister 100 such that the first air which leaves canister 100 when compressor 160 reengages is hyper dried.

Further, since valve 42 is open for only short periods of time and since the air is being forced through valve 42 at all times while it is open, beads 116 will not tend to draw moisture from the atmosphere through valve 42 as would occur if valve 42 were allowed to remain continuously open and desiccant beads 116 were allowed to be at atmospheric pressure all the while compressor 160 was disengaged or not operating. As the efficiency of moisture removal decreases with saturation, such moisture drawn from the atmosphere would detrimentally affect performance when device 10 was returned to service. Thus, the closing of valve 42 isolates beads 116 from the atmosphere and maintains their performance efficiency.

Furthermore, the short duration that valve 42 is open and the continuous pressurization of device 10 above atmospheric pressure are particularly advantageous to prevent turborush, i.e. air from compressor 160 in the unloading mode finding its way to device 10 through inlet 97 and through the open valve 42, without requiring turborush isolation valves to close inlet 97 during regeneration. Thus, fluid communication can be continuously provided through conduit 162 and inlet 97 between compressor 160 and desiccant beads 116.

Additionally, after valve 42 closes and with compressor 160 disengaged, air can backtrack through air inlet 97 and conduit 162 to compressor 160. The pressurization of compressor 160 keeps oil from coming past the rings of compressor 160 and eventually into the air system.

It should then be noted that the life of beads 116 and canister 100 is extended according to the teachings of the present invention. Specifically, beads 116 have an affinity to absorb liquids of any kind and thus tend to attract liquids including oils. While they have the ability to release water absorbed during regeneration, beads 116 are unable to release oil absorbed. Thus, without the present invention, beads 116 can become less efficient as they become saturated with oil. It can then be appreciated that device 10 includes substantial structure, devices, and stages in an attempt to stop the passage of oil to beads 116 and thus protect beads 116 against such degradation. Specifically, filter 98 removes almost all oil from the incoming air flow by itself. In addition, the change in air flow direction as the air passes through removed portions 70 and more importantly the trapping of oil by pads 112 and 114 substantially prevents passage of oil to beads 116. Thus, by utilizing the teachings of the present invention, the time for beads 116 to become saturated with oil is substantially increased to thus maximize the life of beads 116.

It should also be noted that placement of orifice 138 inside of screw 136 secured to follower plate 118 is particularly advantageous in that the path of the regeneration air is generally the same as the air during normal operation. This helps insure that the regeneration of beads 116 occurs throughout canister 100 and helps prevent the creation of dead spots which can occur if regeneration occurs along a different path from normal operation such as when the regeneration orifice is placed to the side. Additionally, it can be appreciated that when valve 42 opens during the regeneration cycle allowing flow of compressed air out of canister 100 at a rate substantially greater than air is allowed to flow through orifice 138, the effective pressure inside of canister 100 is atmospheric which is less than the pressure of the compressed gas in space 151 and on the side of follower plate 118 opposite valve 42. This difference in pressure tends to compact the bed of beads 116 during each of the regeneration cycles and tends to help the pressure shock relied upon for beads 116 to release the absorbed moisture during the regeneration cycle.

The use of a wave-type spring 140 and the ability of spring retainer 142 to be variably placed in side wall 104 according to the present invention is also advantageous in reducing the overall height of canister 100. Specifically, the volume of beads 116 in canister 100 can vary during manufacture but it is desired to place the same compressive force on beads 116 by means of follower plate 118. Prior to the present invention, spiral springs requiring considerable travel were compressed between the follower plate and a fixed cover plate, with the differences in volume being compensated for by the large range of travel. This greatly increased the necessary height of prior canisters. In contrast, the present invention, due to its ability to be adjusted, allows spring retainer 142 to be positioned in side wall 104 according to the height of beads 116 such that the travel distance of spring 140 can be significantly reduced. The use of wave spring 140 over a spiral spring further enhances this reduction in height.

As yet another significant improvement allowed by the present invention, filter 98 can be oriented horizontally in the most preferred form which is particularly advantageous and contrary to conventional wisdom and practice. Specifically, because beads 116 rapidly degrade with the presence of oil, it is desired to remove as much oil as possible from the air flow prior to such air reaching beads 116. Thus, filter 98 should be in the fluid flow before beads 116. Placing filter 98 to the side of canister 100 would allow filter 98 to be vertically orientated but would increase the diametric size of the overall device and restrict the potential installation locations. Placing filter 98 below canister 100 with filter 98 in a vertical orientation would dramatically increase the height of the overall device and restrict the potential installation locations and/or would limit the length of filter 98 and thus restrict the effective life of filter 98 and device 10. Thus, it can now be fully appreciated that the horizontal placement of filter 98 in device 10 according to the preferred teachings of the present invention is especially advantageous in the reduction of the overall size of device 10, in allowing ease of service, and in maximizing the potential installation locations.

However, liquids such as oil which coalesce on filter 98 because of the air flow passing therethrough, over time, wick down filter 98 under gravitational forces thus creating a wet zone. Such liquid coalesced on the filter media restricts the ability of air to flow therethrough. With conventional, vertical orientations, the wet zone occupies 5-10% of the area of the filter media. With conventional thinking, the wet zone in horizontally oriented filters on the other hand would occupy 15-30% of the lower area of the filter media as well as coalescing liquid at the top portion which would also restrict the ability of air to flow therethrough, resulting in a significant reduction in area through which the air flows and a shorter effective life than filters in vertical orientations.

In complete contradistinction, device 10 according to the preferred teachings of the present invention overcomes these disadvantages by several features. First, filter 98, because it is horizontal, can have a length which is generally equal to the diameter of canister 100 and thus has increased area to allow for a larger wet zone while still allowing air flow through the remaining areas of filter 98 at the desired rates and with the desired filter life. In fact, the horizontal orientation allows the length of filter 98 to be maximized while minimizing the overall size of device 10 according to the teachings of the present invention. Additionally, as set forth, the air flow through filter 98 occurs generally through the portions vertically above the wet zone which forms at the bottom of filter 98. Legs 62 direct the air flow vertically downwardly to a position vertically below filter 98 where it is forced to redirect itself 180° as it flows through removed portions 70 and vertically upward outside of legs 62, with removed portions 70 located below the lowermost portion of filter 98. This controlled air flow according to the present invention around filter 98 and vertically downward tends to enhance the wicking down of oil and other liquids in filter 98 to the wet zone and tends to minimize the area of the wet zone in filter 98. Thus, device 10 according to the teachings of the present invention allows filter 98 to be horizontally oriented to achieve the several advantages of such orientation and to overcome the disadvantages which arise from the horizontal orientation.

As yet another feature of the present invention, in the event that the material filtered out by filter 98 clogs filter 98 to an undesired level, the air flow through filter 98 is restricted thus creating a pressure increase upstream therefrom. This pressure is then released through valve 96 which in the preferred form provides an audible signal indicating that it is time to change filter 98. Filter 98 can be easily changed by placing a wrench or similar tool on portion 88 of plug 76 and threading it out of opening 92 of collar 12. After removal of plug 76, a new filter 98 can be replaced on nipple 78 and plug 76 can be threaded back into opening 92. It can then be appreciated that filter 98 can be replaced according to the preferred teachings of the present invention without disconnecting conduits 162 and 166 of the air system from collar 12 or from device 10 and without removal of bottom closure 28 or shell 16 from collar 12 and without removal of collar 12 and shell 16 from frame 23 of the truck or the like.

Device 10 according to the preferred teachings of the present invention has yet the further advantage of ease of servicing canister 100 when indicator 152 visually indicates undesired levels of moisture downstream of canister 100 and specifically within space 151. Specifically, device 10 typically will be mounted to the undercarriage of the truck and have limited, if any, top access thereto. Thus, if it were necessary to remove shell 16 from collar 12 to gain access to canister 100, it would be necessary to remove device 10 from its installation including disconnection from conduits 162 and 166 to do so. However, according to the preferred teachings of the present invention, bottom closure 28 is removed from collar 12 by removing bolts 34. Once bolts 34 have been removed (and plug 76 and filter 98 removed as set forth previously), bottom closure 28, carrier 46 secured thereto by screws 72, and canister 100 secured to carrier 46 by stud 106 as a single assembly can be vertically lowered and removed through the lower open end of passage 14 and from the interior of the housing formed by collar 12 and shell 16, with carrier 46 and canister 100 sliding within passage 14 of collar 12 and without removal of collar 12 or shell 16 and without disconnection of conduits 162 and 166 to inlet 97 and outlet 150. After removal from collar 12, canister 100 can be removed from carrier 46 by relative rotation therebetween to unthread stud 106 from bore 54 and a replacement canister 100 substituted therefor. Thereafter, canister 100 and carrier 46 can be slid within passage 14 of collar 12 until bottom closure 28 abuts therewith and bolts 34 resecured. It should now be noted that the receipt of positioning boss 67 in trough 156 orients carrier 46 relative to collar 12 to insure that the second ends of legs 62 are positioned on opposite sides of opening 92 for receipt of filter 98 in lip 60. After securement of bottom closure 28, filter 98 and plug 76 can be replaced in collar 12 and operation can resume very quickly.

It can then be appreciated that device 10 according to the present invention is advantageous over prior existing devices due to its smaller and lighter design, the ease of service especially without requiring device 10 to be removed from bracket 24 or from conduits 162 and 166, and increased desiccant efficiency due to the multiple stage removal of oils from the gas stream before its entry into the desiccant material, the removal of dead spots in the desiccant material due to the diffusion of the gas stream throughout the desiccant material without channeling and due to the paths being generally the same through the desiccant material in the drying and regeneration cycles. Device 10 according to the present invention can be economically manufactured and assembled and is more cost effective than prior devices. Further, the need for servicing of device 10 according to the preferred teachings of the present invention is signaled to the operator prior to contamination of the system downstream from device 10 and specifically audibly by valve 96 indicating the need to change filter 98 and visually by indicator 152 indicating the need to change desiccant canister 100.

Now that the basic teachings of the present invention have been explained, many extensions and variations will be obvious to one having skill in the art. For example, to reduce inventory requirements and for economies of scale, filter 126 could be replaced with a second set of pads 112 and 114 which would have the added benefit of preventing backtracking of prior contaminants from the air system to beads 116 in the regeneration mode. Likewise, pads 112 and 114 could be replaced with a single pad or the activated carbon and activated alumina could be provided in separate pads.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Method for drying a compressed gas comprising the steps of: providing a system including a source of compressed gas, a storage reservoir, a dryer having an inlet in communication with the source of compressed gas, an outlet in communication with the storage reservoir, an electrically actuated purge valve, desiccant beads requiring regeneration and a chamber, with the outlet being on the opposite side of the desiccant beads than the inlet and the purge valve, with the chamber located intermediate the desiccant beads and the outlet, and with the inlet and purge valve being on the same side of the desiccant beads; providing a check valve intermediate the chamber and the storage reservoir allowing flow of compressed gas from the desiccant beads to the storage reservoir, with the compressed gas in the storage reservoir being available for use; providing a restricted orifice for passage of compressed gas intermediate the chamber and the desiccant beads and parallel to the check valve; stopping the source of compressed gas; providing electrical actuation to the purge valve itself for opening the purge valve to a pressure less than the pressure of the compressed gas in the storage reservoir for a short, predetermined time for drawing compressed gas through the restricted orifice and out the purge valve while the purge valve is open.

2. The method of claim 1 wherein the step of providing a system comprises the step of providing a system wherein fluid communication is continuously provided between the source of compressed gas and the desiccant beads.

3. The method of claim 1 wherein the step of opening the purge valve comprises the step of opening the purge valve in the order of 35 seconds.

4. The method of claim 1 further comprising the step of closing the purge valve during the short, predetermined time in the event that the source of compressed gas restarts during the short, predetermined time.

5. The method of claim 1 wherein the step of providing a system comprises the step of providing a system including an air compressor as the source of compressed gas; and wherein the step of opening the purge valve comprises the step of opening the purge valve to atmospheric pressure.

6. Device for drying a compressed gas comprising, in combination: a hollow housing defining an interior and including a collar having a vertical passage, an inlet, a horizontal opening to the vertical passage, and an outlet in fluid communication with the interior, with the vertical passage being in communication with the interior and having a lower open end; an assembly removably, vertically insertable into the housing through the lower open end, with the assembly including means for closing the lower open end of the housing and for dividing the interior into a first, coalescing portion located in the vertical passage and a second portion, and a desiccant canister insertable into the open end, the vertical passage and the interior, with the desiccant canister having desiccant means and first and second means for providing fluid communication to the desiccant means, with the outlet being in fluid communication with the second portion, with the closing and dividing means including a horizontal plate of a size and shape for slideable and sealing receipt in the vertical passage, with the first, coalescing portion being defined by the horizontal plate and the vertical passage, with the desiccant canister being removably attached to the horizontal plate with the first fluid communication means being in fluid communication with the first, coalescing portion and the second fluid communication means being in fluid communication with the second portion, with a U-shaped lip extending vertically downward from the horizontal plate and including first and second vertical legs having first ends connected by a connecting portion, with the connecting portion including a land projecting inward therefrom; a plug removably secured in the horizontal opening, with the plug having a through passage including a first port and a second port, first and second shoulders spaced from each other, a cross passage located between the first and second shoulders and intersecting with the through passage, and a filter nipple; a filter slideably received on the filter nipple and being in fluid communication with the second port and of a size and shape for passage through the horizontal opening for removal with the plug, with the first shoulder being of a size for slideable and sealing receipt within the horizontal opening, with the second shoulder being of a size for sealing the horizontal opening, with the inlet being in fluid communication with the cross passage, with the filter located between the first and second legs and sandwiched between the land of the lip and the first shoulder of the plug, with the horizontal plate and legs directing the flow of the compressed gas stream vertically downward and intermediate the first and second legs to enhance the wicking down of the coalesced liquid molecules to a wet zone located at the vertically lower portions of the filter, with the flow through the filter occurring through the filter above the wet zone; and a pressure relief valve in fluid communication with the first port.

7. The drying device of claim 6 wherein the closing and dividing means further includes a bottom closure of a size larger than the passage and removably secured to the collar for closing the lower open end of the housing, with the bottom closure including a sump, with the filter being tubular and being orientated with the axial flow direction being horizontal and vertically above and diametrically across the sump.

8. The drying device of claim 7 wherein the desiccant canister is located vertically above the horizontal plate, with the first and second legs having removed portions at a position vertically below the filter, with the compressed gas stream flowing through the removed portions and turning 180° vertically upward outside of the first and second legs to the desiccant canister.

9. The drying device of claim 7 wherein the sump includes an electrically actuated purge valve, with the purge valve being opened for a short, predetermined time in the order of 35 seconds.

10. The drying device of claim 9 wherein the canister has a side wall containing the desiccant means, a regeneration orifice allowing restricted flow of the compressed gas to and from the desiccant means, a follower plate supported upon the desiccant means, a check valve allowing flow of the compressed gas in a first direction out of the desiccant means at a rate substantially greater than through the regeneration orifice and preventing flow of the compressed gas opposite to the first direction, with the second fluid communication means including the check valve and the regeneration orifice, with the check valve and the regeneration orifice being in a parallel arrangement, with the purge valve in fluid communication with the desiccant means on the side opposite the regeneration orifice and the check valve, characterized in that the follower plate is in sealing engagement with the side wall of the canister, with the regeneration orifice and check valve carried by the follower plate, and with the follower plate being movable against the desiccant means by the pressure differential when the flow of compressed gas is stopped in the first direction and the purge valve is open allowing flow of the compressed gas at a rate substantially greater than through the regeneration orifice and to a pressure less than the pressure of the compressed gas on the side of the regeneration orifice opposite the purge valve.

11. The drying device of claim 10 wherein the desiccant canister includes a bottom wall, with the side wall upstanding from the bottom wall; and at least a first porous pad impregnated with activated carbon and activated alumina supported on the bottom wall and having an outer periphery of a size and shape corresponding to the side wall, with the desiccant means supported upon the porous pad and within the side wall, with the first fluid communication means including means formed in the bottom wall for providing fluid communication of the compressed gas therethrough, with the porous pad diffusing the compressed gas from the fluid communication providing means throughout the area of the porous pad, with the porous pad having an affinity for and trapping oil aerosols of the compressed gas.

12. Device for drying a stream of compressed gas including a canister having a side wall containing desiccant beads, a regeneration orifice allowing restricted flow of the compressed gas to and from the desiccant beads, a check valve allowing flow of the compressed gas in a first direction out of the desiccant beads at a rate substantially greater than through the regeneration orifice and preventing flow of the compressed gas opposite to the first direction, with the check valve and the regeneration orifice being in a parallel arrangement, with the check valve having a flexible disc positioned over passages, characterized in that the flexible disc is secured by a screw, with the regeneration orifice being in the screw so that the path of the compressed gas through the desiccant beads from the regeneration orifice is generally the same as to the passages.

13. The drying device of claim 12 wherein the passages are arranged concentrically around the screw.

14. The drying device of claim 12 further comprising, in combination: a filter positioned between the desiccant beads and the regeneration orifice and the passages for diffusing the compressed gas to and from the desiccant beads and the regeneration orifice and the check valve and for stopping flow of dust from the desiccant beads to the regeneration orifice and the check valve.

15. Device for drying a compressed gas including a canister having a side wall containing desiccant beads, and a follower plate biased against the desiccant beads by a spring characterized in a spring retainer slideable in the side wall at variable placements inside the side wall, with the spring sandwiched between the follower plate and the spring retainer; and means for retaining the spring retainer at a placement in the side wall according to the amount of desiccant beads in the canister to bias the follower plate against the desiccant beads and providing adjustment of the bias of the spring according to the amount of desiccant beads in the canister.

16. The drying device of claim 15 wherein the spring is of the wave-type to reduce the overall height requirement of the canister.

17. The drying device of claim 15 wherein the follower plate is in sealing engagement with the side wall of the canister.

18. Device for drying a compressed gas comprising, in combination: a hollow housing defining an interior and including a collar having a vertical passage, an inlet in fluid communication with the passage, and an outlet in fluid communication with the interior, with the passage being in communication with the interior and having a lower open end; and an assembly removably, vertically insertable into the housing through the lower open end, with the assembly including means for closing the lower open end of the housing and for dividing the interior into a first portion located in the vertical passage and a second portion, with the outlet being in fluid communication with the second portion, and a desiccant canister insertable into the lower open end, the vertical passage and the interior and having desiccant means and first and second means for providing fluid communication to the desiccant means, with the desiccant canister being removably attached to the assembly with the first fluid communication means being in fluid communication with the first portion and the second fluid communication means being in fluid communication with the second portion.

19. The drying device of claim 18 wherein the passage has an upper open end; and wherein the housing further includes a shell having an interior and a lower open end secured to the collar, with the interior of the shell being in fluid communication with the upper open end of the passage, with the desiccant canister located in the shell when the assembly is inserted into the housing and with the desiccant canister being insertable into the shell while the lower end of the shell is secured to the collar.

20. The drying device of claim 18 wherein the closing and dividing means comprises a bottom closure of a size larger than the passage and removably secured to the collar for closing the lower open end of the housing.

21. The drying device of claim 20 wherein the bottom closure defines a sump including a purge valve.

22. The drying device of claim 21 further comprising, in combination: a coalescing filter in fluid communication with the inlet and located in the first position, with the coalescing filter being in the shape of a tube and extending horizontally into the first portion vertically above and diametrically across the sump.

23. The drying device of claim 21 wherein the closing and dividing means further comprises, in combination: a carrier supported on the bottom closure, with the carrier including a plate of a size and shape for slideable and sealing receipt in the passage, with the first portion being defined by the plate, the bottom closure, and the passage, with the desiccant canister being removably attached to the plate.

24. The drying device of claim 23 wherein the carrier is secured to the bottom closure.

25. The drying device of claim 23 further comprising, in combination: a coalescing filter in fluid communication with the inlet and located in the first position.

26. The drying device of claim 25 wherein the coalescing filter is removable from the first portion while the bottom closure is secured to the collar.

27. The drying device of claim 26 wherein the coalescing filter is in the shape of a tube; and wherein the collar includes an opening intersecting with the passage; and wherein the drying device further comprises, in combination: a plug having a through passage, with the coalescing filter being in fluid communication with the through passage, with the filter being insertable through the opening, and with the plug closing the opening.

28. The drying device of claim 27 further comprising, in combination: a pressure relief valve secured to the plug and in fluid communication with the through passage, with the plug defining an inlet chamber in the opening, with the inlet being separate from and intersecting with the opening in the inlet chamber, with the plug further including a cross passage intersecting with the through passage and in fluid communication with the inlet chamber.

29. Filter device for fluid flowing under pressure and including contaminates comprising, in combination: an inlet chamber having a first port and a second port; a filter in fluid communication with the second port; a pressure relief valve in fluid communication with the first port for automatically releasing fluid through the first port in the event that the pressure of the fluid in the inlet chamber reaches an undesired level; and an inlet intersecting with the inlet chamber intermediate the first and second ports with the fluid flowing under pressure through the inlet and into the inlet chamber and through the second port and the filter, with the filter removing the contaminates from the fluid flow.

30. The filter device of claim 29 wherein at least the first port is removable.

31. The filter device of claim 29 wherein the inlet chamber is formed and defined by a plug removably secured in an opening, with the plug having a through passage including the first port and the second port and having a cross passage intersecting with the through passage intermediate the first and second ports, with the inlet being in fluid communication with the cross passage.

32. The filter device of claim 31 wherein the plug includes a filter nipple for slideably receiving the filter, with the filter being of a size and shape for passage through the opening for removal with the plug.

33. The filter device of claim 32 wherein the plug further includes first and second shoulders spaced from each other, with the cross passage located between the first and second shoulders, with the first shoulder being of a size for slideable and sealing receipt within the opening and the second shoulder being of a size for sealing the opening.

34. Cleaning device for a compressed gas stream including liquid molecules comprising, in combination: a tubular coalescing filter having an axial flow direction, with cross sections perpendicular to the axial flow direction including inner and outer diameters, with the compressed gas stream received in the inner diameter and flowing through the filter and out the outer diameter to coalesce liquid molecules in the gas stream; and a coalescing chamber, with the coalescing chamber including a sump, with the filter being orientated with the axial flow direction being horizontal and vertically above and diametrically across the sump.

35. The cleaning device of claim 34 wherein the coalescing chamber comprises, in combination: a horizontal plate located above the filter; and first and second, vertical legs extending from the horizontal plate and on opposite sides of the filter to a position vertically below the filter, with the plate and legs directing the flow of the compressed gas stream vertically downward and intermediate the first and second legs to enhance the wicking down of the coalesced liquid molecules to a wet zone located at the vertically lower portions of the filter, with the flow through the filter occurring through the filter above the wet zone.

36. The cleaning device of claim 35 further comprising, in combination: a desiccant canister located vertically above the horizontal plate, with the first and second legs having removed portions at a position vertically below the filter, with the compressed gas stream flowing through the removed portions and turning 180° vertically upward outside of the first and second legs to the desiccant canister.

37. Desiccant canister for a device for drying compressed gas including oil aerosols comprising, in combination: a bottom wall; a side wall upstanding from the bottom wall; at least a first porous pad impregnated with activated carbon and activated alumina supported on the bottom wall and having an outer periphery of a size and shape corresponding to the side wall; desiccant beads supported upon the porous pad and within the side wall; and means formed in the bottom wall for providing fluid communication of the compressed gas therethrough, with the porous pad diffusing the compressed gas from the fluid communication providing means throughout the area of the porous pad, with the porous pad having an affinity for and trapping oil aerosols of the compressed gas.

38. The desiccant canister of claim 37 wherein the bottom wall has a top surface and a bottom surface; and wherein the fluid communication providing means comprises, in combination: enlarged cavities extending from the top surface towards but spaced from the bottom surface, with the porous pad being supported on the top surface of the bottom wall and extending over the enlarged cavities; and axial passages extending from the enlarged cavities to the bottom-surface, with the enlarged cavities diffusing the compressed gas from the passages throughout the area of the enlarged cavities.

39. The desiccant canister of claim 38 further comprising, in combination: a follower plate having a top surface and a bottom surface and of a size and shape corresponding to and for slideable receipt in the side wall; means for biasing the follower plate against the desiccant beads; a filter located intermediate the desiccant beads and the follower plate and having an outer periphery of a size and shape corresponding to the side wall; enlarged cavities extending from the bottom surface towards but spaced from the top surface of the follower plate, with the filter being supported on the bottom surface of the follower plate and extending over the enlarged cavities of the follower plate; and axial passages extending from the enlarged cavities of the follower plate to the top surface of the follower plate, with the filter diffusing the compressed gas between the desiccant beads and the enlarged cavities of the follower plate and the enlarged cavities of the follower plate diffusing the compressed gas from the enlarged cavities to the passages of the follower plate.

40. The desiccant canister of claim 39 further comprising, in combination: a flexible disc positioned over the passages of the follower plate, with the flexible disc allowing flow of the compressed gas from the enlarged disc cavities out of the passages of the follower plate but preventing flow of tile compressed gas into the passages of the follower plate; and a regeneration orifice carried by the follower plate, with the follower plate being movable against the desiccant beads by the pressure differential when the flow of compressed gas is stopped and the desiccant beads are being regenerated by the back flow of gas through the regeneration orifice.

41. The desiccant canister of claim 40 wherein the flexible disc is secured to the follower plate by a screw, with the regeneration orifice being in the screw.

42. The desiccant canister of claim 39 wherein the biasing means comprises, in combination: a spring retainer slideable in the side wall; a spring sandwiched between the follower plate and the spring retainer; and means for retaining the spring retainer in the side wall to bias the follower plate against the desiccant beads and providing adjustment of the bias of the spring according to the amount of desiccant beads in the canister.

43. The desiccant canister of claim 42 wherein the spring is of the wave-type to reduce the overall height requirement of the desiccant canister.

44. The desiccant canister of claim 38 wherein the device further includes a carrier; and wherein the desiccant canister further comprises, in combination: means for removably securing the bottom wall to the carrier, with the carrier having a top surface and a bottom surface, with the bottom surface of the bottom wall abutting with the top surface of the carrier when the bottom wall is secured to the carrier, with the carrier including an enlarged cavity extending from the top surface towards but spaced from the bottom surface of the carrier and in fluid communication with the passages of the bottom wall, and with the carrier including passages extending from the enlarged cavity to the bottom surface of the carrier, with the enlarged cavity of the carrier diffusing compressed gas from the passages of the carrier to the passages of the bottom wall.

45. Desiccant canister for a device for drying compressed gas comprising, in combination: a bottom wall having a top surface and a bottom surface; a side wall upstanding from the bottom wall; at least a first porous pad supported on the bottom wall and having an outer periphery of a size and shape corresponding to the side wall; desiccant beads supported upon the porous pad and within the side wall; enlarged cavities extending from the top surface towards but spaced from the bottom surface, with the porous pad being supported on the top surface of the bottom wall and extending over the enlarged cavities; and axial passages extending from the enlarged cavities to the bottom surface, with the enlarged cavities diffusing the compressed gas from the passages throughout the area of the enlarged cavities.

46. The desiccant canister of claim 45 further comprising, in combination: a follower plate having a top surface and a bottom surface and of a size, and shape corresponding to and for slideable receipt in the side wall; means for biasing the follower plate against the desiccant beads; a filter located intermediate the desiccant beads and the follower plate and having an outer periphery of a size and shape corresponding to the side wall; enlarged cavities extending from the bottom surface towards but spaced from the top surface of the follower plate, with the filter being supported on the bottom surface of the follower plate and extending over the enlarged cavities of the follower plate; and axial passages extending from the enlarged cavities of the follower plate to the top surface of the follower plate, with the filter diffusing the compressed gas between the desiccant beads and the enlarged cavities of the follower plate and the enlarged cavities of the follower plate diffusing the compressed gas from the enlarged cavities to the passages of the follower plate.

47. The desiccant canister of claim 46 further comprising, in combination: a flexible disc positioned over the passages of the follower plate, with the flexible disc allowing flow of the compressed gas from the enlarged disc cavities out of the passages of the follower plate but preventing flow of the compressed gas into the passages of the follower plate; and a regeneration orifice carried by the follower plate, with the follower plate being movable against the desiccant beads by the pressure differential when the flow of compressed gas is stopped and the desiccant beads are being regenerated by the back flow of gas through the regeneration orifice.

48. The desiccant canister of claim 46 wherein the flexible disc is secured to the follower plate by a screw, with the regeneration orifice being in the screw.

49. The desiccant canister of claim 48 wherein the biasing means comprises, in combination: a spring retainer slideable in the side wall; a spring sandwiched between the follower plate and the spring retainer; and means for retaining the spring retainer in the side wall to bias the follower plate against the desiccant beads and providing adjustment of the bias of the spring according to the amount of desiccant beads in the canister.

50. The desiccant canister of claim 49 wherein the spring is of the wave-type to reduce the overall height requirement of the desiccant canister.

51. The desiccant canister of claim 45 wherein the device further includes a carrier; and wherein the desiccant canister further comprises, in combination: means for removably securing the bottom wall to the carrier, with the carrier having a top surface and a bottom surface, with the bottom surface of the bottom wall abutting with the top surface of the carrier when the bottom wall is secured to the carrier, with the carrier including an enlarged cavity extending from the top surface towards but spaced from the bottom surface of the carrier and in fluid communication with the passages of the bottom wall, and with the carrier including a plurality of passages extending from the enlarged cavity to the bottom surface of the carrier, with the enlarged cavity of the carrier diffusing compressed gas from the passages of the carrier to the passages of the bottom wall.

52. Device for drying a stream of compressed gas including a canister having a side wall containing desiccant beads, a regeneration orifice allowing restricted flow of the compressed gas to and from the desiccant beads, a follower plate supported upon the desiccant beads, a check valve allowing flow of the compressed gas in a first direction out of the desiccant beads at a rate substantially greater than through the regeneration orifice and preventing flow of the compressed gas opposite to the first direction, with the check valve and the regeneration orifice being in a parallel arrangement, and a purge valve in fluid communication with the desiccant beads on the side opposite the regeneration orifice and the check valve, characterized in that the follower plate is in sealing engagement with the side wall of the canister, with the regeneration orifice and check valve carried by the follower plate, and with the follower plate being movable against the desiccant beads by the pressure differential when the flow of compressed gas is stopped in the first direction and the purge valve is open allowing flow of the compressed gas at a rate substantially greater than through the regeneration orifice and to a pressure less than the pressure of the compressed gas on the side of the regeneration orifice opposite the purge valve; wherein the check valve comprises a flexible disc positioned over passages formed in the follower plate, with the flexible disc being secured to the follower plate by a screw, with the regeneration orifice being in the screw.

53. The drying device of claim 52 further comprising, in combination: a spring retainer slideable in the side wall at variable placements inside the side wall; a spring sandwiched between the follower plate and the spring retainer; and means for retaining the spring retainer in the side wall to bias the follower plate against the desiccant beads and providing adjustment of the bias of the spring according to the amount of desiccant beads in the canister.

54. The drying device of claim 53 wherein the spring is of the wave-type to reduce the overall height requirement of the canister.

55. The drying device of claim 52 further comprising, in combination: a filter positioned between the desiccant beads and the follower plate for diffusing the compressed gas to and from the desiccant beads and the regeneration orifice and the check valve and for stopping flow of dust from the desiccant beads to the regeneration orifice and the check valve.

56. The drying device of claim 52 wherein the passages are arranged concentrically around the regeneration orifice so that the path of the compressed gas through the desiccant beads from the regeneration orifice is generally the same as to the passages.

* * * * *

UNITED STATES PATENT AND TRADEMARK OFFICE
CERTIFICATE OF CORRECTION

PATENT NO. : 5,427,609

DATED : June 27, 1995

INVENTOR(S) : Norbert P. Zoglman et al.

It is certified that error appears in the above-identified patent and that said Letters Patent is hereby corrected as shown below:

Column 8, line 60, cancel "With" and substitute therefor --with--.

Column 20, line 26, cancel "tile" and substitute therefor --the--.

Signed and Sealed this

Twenty-sixth Day of September, 1995

Attest:

BRUCE LEHMAN

Attesting Officer

Commissioner of Patents and Trademarks